United States Patent [19]
Yonemoto

[11] Patent Number: 5,434,619
[45] Date of Patent: Jul. 18, 1995

[54] SOLID-STATE IMAGING DEVICE IMAGING DEVICE HAVING NOISE CANCELLATION AND AN OUTPUT PIXEL SIGNAL

[75] Inventor: Kazuya Yonemoto, Tokyo, Japan

[73] Assignee: Sony Corporation, Tokyo, Japan

[21] Appl. No.: 216,330

[22] Filed: Mar. 23, 1994

[30] Foreign Application Priority Data

Mar. 24, 1993 [JP] Japan ................... 5-090927

[51] Int. Cl.⁶ .......................................... H04N 5/335
[52] U.S. Cl. ..................... 348/241; 348/303; 348/308
[58] Field of Search ............... 348/241, 243, 248, 207, 348/308, 294, 302, 303; H04N 5/335; 250/208.1, 206

[56] References Cited

U.S. PATENT DOCUMENTS

4,845,382  7/1989  Eouzan et al. ............... 348/24
4,914,519  4/1990  Hashimoto et al. .......... 348/241
5,278,658  1/1994  Takase ......................... 348/243

Primary Examiner—Yon J. Couso
Assistant Examiner—Tuan V. Ho
Attorney, Agent, or Firm—Hill, Steadman & Simpson

[57] ABSTRACT

In a solid-state imaging device, a fixed pattern noise (FPN) of each pixel can be accurately and reliably canceled without using an analog-to-digital converter and a memory having a large storage capacity. One end of each of first and second sample and hold circuits is connected to vertical signal lines. A subtracter is connected to outputs of the sample and hold circuits through a switching means to thereby subtract a noise signal output from one of the first and second sample and hold circuits from a pixel signal output from the other sample and hold circuit.

16 Claims, 5 Drawing Sheets

SOLID-STATE IMAGING DEVICE IMAGING DEVICE HAVING NOISE CANCELLATION AND AN OUTPUT PIXEL SIGNAL

BACKGROUND OF THE INVENTION

1. Field of the Invention

The present invention relates to solid-state imaging devices and, more particularly, to an amplifying type solid-state imaging device in which a fixed pattern noise (FPN) can be canceled from a video signal formed from a pixel (i.e., pixel signal).

2. Description of the Related Art

Figure 1:
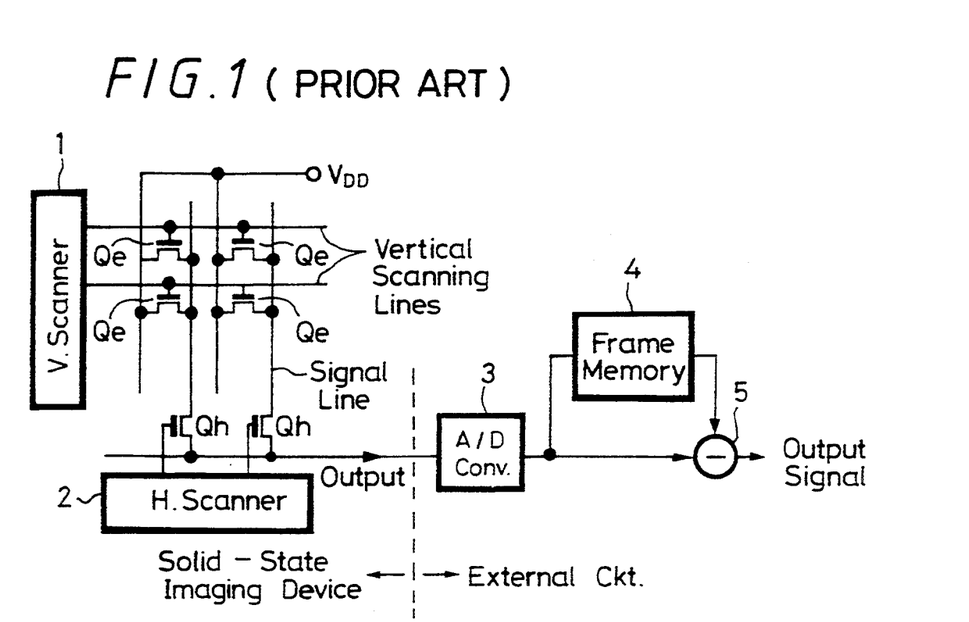
FIG. 1 is a diagram showing an arrangement of an example of a conventional amplifying type solid-state imaging device.

FIG. 1 of the accompanying drawings shows an example of a conventional amplifying type solid-state imaging device.

As shown in FIG. 1, MOS (metal oxide semiconductor) transistors Qe, Qe, . . . , each having an annular-shaped gate, form pixels. The MOS transistors Qe, Qe, . . . are arranged in a matrix of rows and columns (i.e., in a two-dimensional fashion). Each of the MOS transistors Qe, Qe, . . . , has an annular-shaped gate. A drain provided at the outside of the annular-shaped gate of the MOS transistor Qe is connected to a power supply ($V_{DD}$ line) and a source provided at the inside of the annular-shaped gate of the MOS transistor Qe is connected to signal lines. The annular-shaped gate of the MOS transistor Qe is connected to vertical scanning lines. The annular-shaped gate is made of thin transparent polysilicon, and a channel current of the MOS transistors Qe, Qe, . . . is modulated by photoelectrically converting light incident on the channel through the angular-shaped gate. Horizontal switching transistors Qh, Qh, . . . , are connected between signal lines associated with vertical columns of pixels and an output line in order to effect the horizontal scanning.

A vertical scanner (vertical scanning circuit) 1 is adapted to scan horizontal rows of the pixels that are arranged in a matrix fashion. A horizontal scanner (horizontal scanning circuit) 2 is adapted to control the horizontal switching transistors Qh, Qh, . . . A signal of a pixel which belongs to the horizontal row scanned by the vertical scanner 1 and which belongs to the column scanned by the horizontal scanner 2 is output to the exterior as an output signal of the amplifying type solid-state imaging device.

An analog-to-digital (A/D) converter 3 is provided exteriorly of the amplifying type solid-state imaging device. The A/D converter 3 converts an output pixel signal from the amplifying type solid-state imaging device into a digital signal. A frame memory 4 is adapted to store therein one frame of the output signal from the A/D converter 3. More specifically, the frame memory 4 stores therein one frame of the output signal from the A/D converter 3 in order to cancel a noise signal (fixed pattern noise). In the following description of the present invention, the fixed pattern noise will be referred to hereinafter as "FPN" for simplicity.

A subtracter 5 subtracts the signal (noise signal) output from the frame memory 4 from the digital signal (pixel signal) output from the A/D converter 3.

In the conventional solid-state imaging device shown in FIG. 1, the frame memory 4 stores therein one frame of a pixel signal (corresponding to an FPN signal, i.e., noise signal) obtained when the entire amplifying type solid-state imaging device is shielded from light from the outside. If the pixel signal is normally output from the A/D converter 3 when light becomes incident on the amplifying type solid-state imaging device, then the noise signal of the pixel of the pixel signal is read out from the frame memory 4 and the FPN is canceled by subtracting the noise signal from the pixel signal of the same pixel by the subtracter 5.

Figure 2:
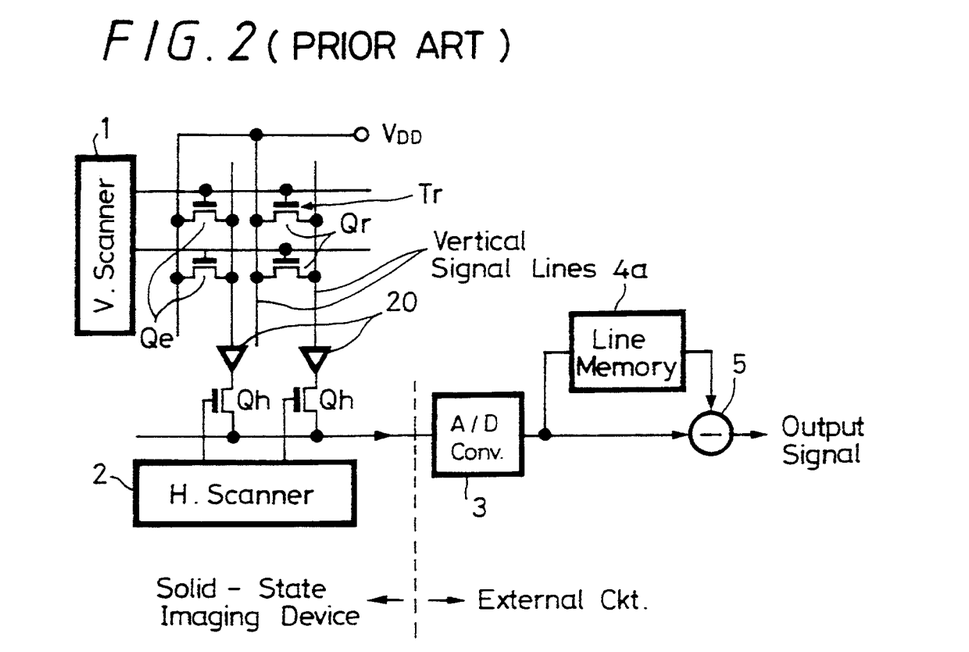
FIG. 2 is a diagram showing an arrangement of another example of a conventional amplifying type solid-state imaging device.

FIG. 2 is a schematic diagram showing an arrangement of another example of the conventional amplifying type solid-state imaging device.

As shown in FIG. 2, in this amplifying type solid-state imaging device, the FPN that occurred in the pixel Tr is canceled by CDS (correlated double sampling) circuits 20 provided between the horizontal switching transistors Qh and the signal lines. Also, the FPN generated by the CDS circuit 20 is canceled by subtracting the FPN from the pixel signal. As shown in FIG. 2, the frame memory 4 shown in FIG. 1 is replaced with a line memory 4a. The line memory 4a stores therein as a noise signal an optical black signal of one horizontal line portion in a vertical optical black row (not shown) during a vertical optical blanking period.

The amplifying type solid-state imaging device shown in FIG. 1 requires that the frame memory 4 have a storage capacity large enough to store therein the noise signal of one frame. Furthermore, this solid-state imaging device requires that the A/D converter 3 to digitize the output pixel signal so that the output pixel signal may be stored in the frame memory 4. There is then the problem that the amplifying type solid-state imaging device cannot be made inexpensive. Furthermore, there is the problem that the noise signal of one frame should be stored in the frame memory 4 each time the cameraman takes a picture.

The amplifying type solid-state imaging device shown in FIG. 2 requires that the line memory 4a have a storage capacity of one horizontal line amount though this storage capacity of the line memory 4a is not as large as that of the frame memory 4. The amplifying type solid-state imaging device shown in FIG. 2 also requires the A/D converter 3 and therefore cannot be made inexpensive satisfactorily. Furthermore, although the amplifying type solid-state imaging device shown in FIG. 2 need not store the noise signal (unlike the amplifying type solid-state imaging device shown in FIG. 1), and since the noise signal is automatically written in the line memory 4a at every frame so as to cancel the FPN, the amplifying type solid-state imaging device shown in FIG. 2 has the problem that FPNs which are different at every pixel cannot be canceled out completely, because FPNs of all horizontal lines are canceled by the optical black signal of one horizontal line regardless of the fact that FPNs have subtle differences at every horizontal line.

Furthermore as the related art, U.S. Pat. No. 4,914,519 describes, a photoelectric-conversion apparatus has sample and hold circuits which sample and hold a signal read out from the same photoelectric converting element, and a refreshed remaining signal and a noise is canceled by effecting a subtraction on the above two signals.

OBJECTS AND SUMMARY OF THE INVENTION

It is therefore an object of the present invention to provide an improved solid-state imaging device in which the aforesaid shortcomings and disadvantages of the prior art can be eliminated.

It is another object of the present invention to provide a solid-state imaging device in which a fixed pattern noise (FPN) of each pixel can be accurately and reliably canceled without using an analog-to-digital converter and a memory having a large storage capacity.

According to a first aspect of the present invention, there is provided a solid-state imaging device which is comprised of a plurality of pixels arranged in a matrix of rows and columns, each pixel converting incident light into a pixel signal, vertical scanning lines associated with rows of the pixels and vertical signal lines associated with columns of the pixels for respectively outputting the pixel signal, first and second sample and hold circuits associated with each of the vertical signal lines, the sample and hold circuits sampling and holding the pixel signal and a noise signal alternately, and a subtracter associated with the first and second sample and hold circuits through first switching means so that an output of the first and second sample and hold circuits is input to a first input terminal of the subtracter when the noise signal is output, and is input to a second input terminal of the subtracter when the pixel signal is output to thereby obtain an output signal by subtracting the noise signal from the pixel signal.

In the solid-state imaging device according to the first aspect of the present invention, the pixel signal and the noise signal from the same pixel are sampled and held by the same sample and hold circuit of the first and second sample and hold circuits.

In the solid-state imaging device according to the first aspect of the present invention, the first and second sample and hold circuits sample and hold the pixel signal and the noise signal alternately at every horizontal scanning period so that a pixel signal and a noise signal to be sampled and held during the same horizontal scanning period are generated from different pixels.

In the solid state imaging device according to the first aspect of the present invention, the first and second sample and hold circuits and the subtracter have amplifying means and a second switching means connected therebetween.

In the solid state imaging device according to the first aspect of the present invention, the vertical signal lines are grounded through load means.

In the solid-state imaging device according to the first aspect of the present invention, the pixel includes an MOS transistor having a gate connected to the vertical scanning lines, a source connected to the vertical signal lines and a drain connected to a power supply. In this case, the MOS transistor is arranged such that a channel current is modulated on the basis of an amount of electric charges which are accumulated under the gate thereof by photoelectric conversion.

According to a second aspect of the present invention, there is provided a solid-state imaging device which is comprised of a plurality of pixels arranged in a matrix of rows and columns, each pixel converting incident light into a pixel signal, vertical scanning lines associated with rows of the pixels and vertical signal lines, associated with columns of the pixels for respectively outputting the pixel signal, a first sample and hold circuit for sampling and holding a pixel signal and being associated with a first output line, a second sample and hold circuit for sampling and holding a noise signal after resetting the pixel and being associated with a second output line, and a subtracter for receiving an output of the first and second sample and hold circuits through the first and second output lines to thereby obtain an output signal by subtracting the noise signal from said pixel signal.

In the solid-state imaging device according to the second aspect of the present invention, the vertical signal lines are grounded through load means.

In the solid-state imaging device according to the second aspect of the present invention, the pixel includes an MOS transistor having a gate connected to the vertical scanning lines, a source connected to the vertical signal lines and a drain connected to a power supply. In this case, the MOS transistor is arranged such that a channel current is modulated on the basis of an amount of electric charges which are accumulated under the gate thereof by photoelectric conversion.

In accordance with a third aspect of the present invention, there is provided a solid-state imaging device which is comprised of a plurality of pixels arranged in a matrix of rows and columns, each pixel converting incident light into a pixel signal, vertical scanning lines associated with rows of pixels and vertical signal lines, associated with columns of the pixels for respectively outputting the pixel signal, first and second sample and hold means connected to the vertical signal lines in parallel with each other and sampling and holding the pixel signal and a noise signal alternately, and sampling and holding different signals of the pixel signal and the noise signal during the same horizonal scanning period, means for delaying an output of the pixel signal from the first sample and hold circuit by one horizontal scanning period and outputting the delayed pixel signal, and a subtracter connected to the first and second sample and hold circuits and subtracting a noise signal from an output of the delayed pixel signal.

In the solid-state imaging device according to the third aspect of the present invention, the pixel signal and the noise signal of the same pixel are sampled and held by the same sample and hold circuit.

Therefore, according to the solid-state imaging device of the present invention, since the pixel signal and the noise signal of the same pixel output from the first and second sample and hold circuits are simultaneously input to the subtracter which then subtracts the noise signal from the pixel signal, the FPN (fixed pattern noise) of each pixel can be canceled accurately and reliably. Thus, even when the FPN between the pixels is fluctuates, it is possible to obtain an accurate pixel signal, i.e., a pixel signal which precisely corresponds to the amount of light incident on the pixel.

According to the solid-state imaging device of the present invention, since the pixel signal and the noise signal are sampled and held by the same sample and hold circuit without fail, the FPN in the sample and hold circuit can be prevented from being mixed into the pixel signal, and a more accurate noise signal can be obtained.

According to the solid-state imaging device of the present invention, even when the pixel signal and the noise signal that are sampled and held by the first and second sample and hold circuits during the same horizontal scanning period are generated from other pixels, the pixel signal and the noise signal of the same pixel can simultaneously be input to the subtracter by alternately sampling and holding the pixel signal and the noise signal by the first and second sample and hold circuits and by delaying the pixel signal, and the FPN can be canceled.

According to the solid-state imaging device of the present invention, since the first sample and hold circuit samples and holds the pixel signal and the second sample and hold circuit samples and holds the noise signal, and the pixel signal and the noise signal are simultaneously input to the subtracter through the first and second output lines, it is possible to remove the switching means that is used to input the pixel signal and the noise signal of the same pixel to the subtracter at the same time.

According to the solid-state imaging device of the present invention, since the two signals from the first and second sample and hold circuits are switched by the second switching means and are amplified by one amplifying means, an S/N can be improved and the subtracter can subtract the noise signal from the pixel signal. Moreover, because the subtracted pixel signal and the subtraction noise signal are amplified by the same amplifying means, the FPN in the amplifying means can be prevented from being mixed into the pixel signal.

Further, according to the solid-state imaging device of the present invention, since the vertical signal lines are grounded through the load means, the MOS transistor which forms the pixel and the load means constitute a source-follower circuit, so that the output impedance is lowered.

Further, according to the solid-state imaging device of the present invention, the solid-state imaging device of the present invention can be applied to a solid-state imaging device of the type such that the pixel is formed of the MOS transistor.

Furthermore, according to the solid-state imaging device of the present invention, the solid-state imaging device of the present invention can be applied to an amplifying type solid-state imaging device.

The above and other objects, features, and advantages of the present invention will become apparent from the following detailed description of illustrative embodiments thereof to be read in conjunction with the accompanying drawings, in which like reference numerals are used to identify the same or similar parts in the several views.

DETAILED DESCRIPTION OF THE PREFERRED EMBODIMENTS

A solid-state imaging device according to the embodiments of the present invention will be described hereinafter in detail with reference to the drawings.

Figure 3:
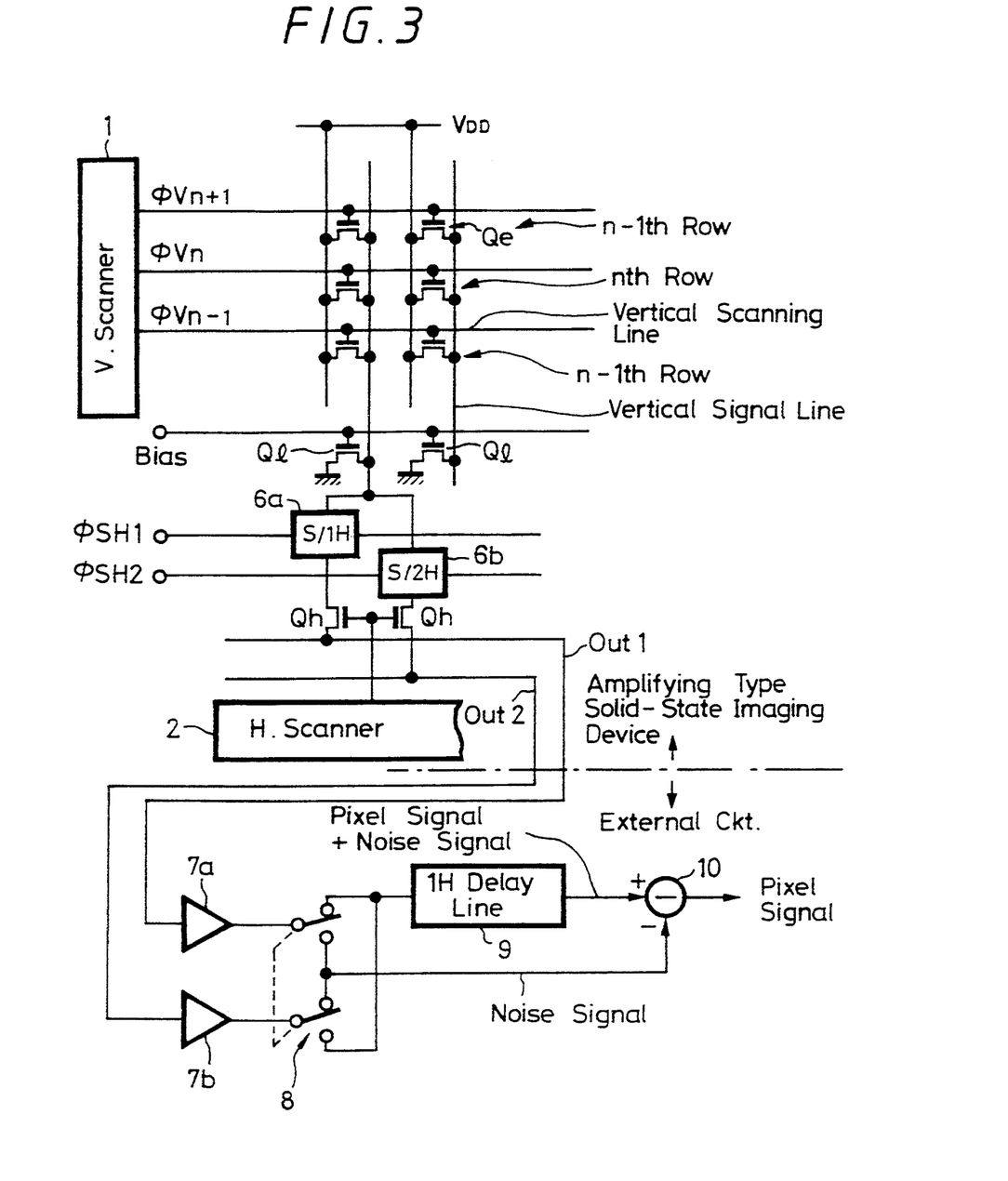
FIG. 3 is a diagram showing an arrangement of a solid-state imaging device according to a first embodiment of the present invention.
Figure 4:
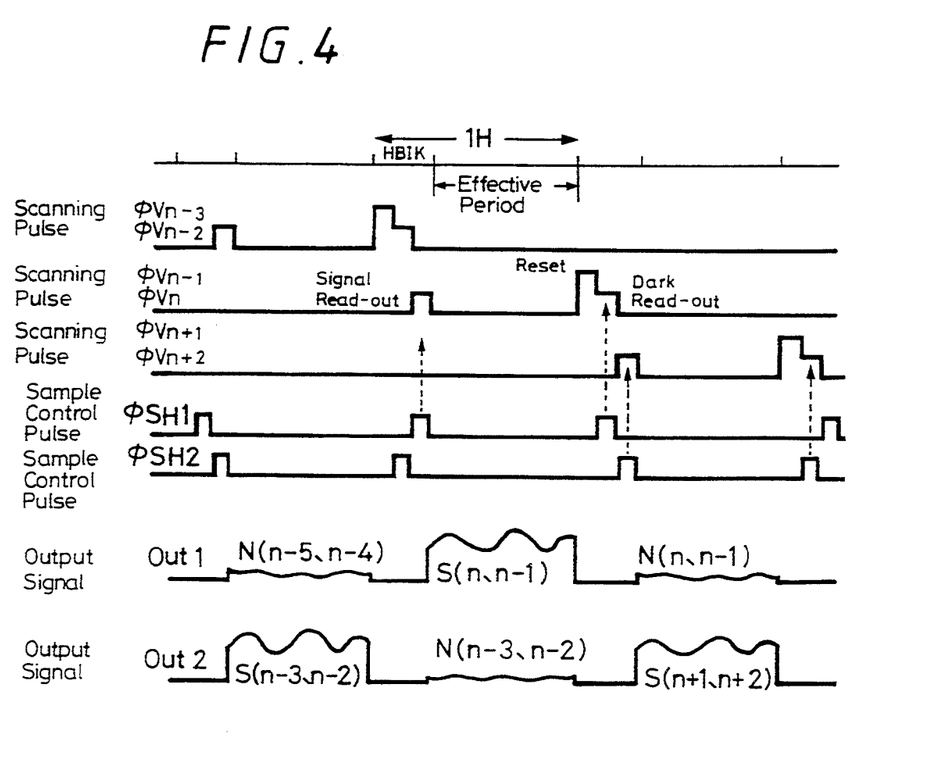
FIG. 4 is a timing chart used to explain operation of the first embodiment according to the present invention.

FIG. 3 shows a solid-state imaging device according to a first embodiment of the present invention. FIG. 4 is a timing chart used to explain operation of the first embodiment according to the present invention.

The solid-state imaging device according to the present invention has features different from and common to those of the prior-art solid-state imaging devices shown in FIGS. 1 and 2. The features common to the conventional solid-state imaging devices shown in FIGS. 1 and 2 have been described so far, and therefore only the different features of the solid-state imaging device shown in FIG. 3 will be described below in detail.

One of the most specific features of the solid-state imaging device according to the first embodiment of the present invention will be described. As shown in FIG. 3, to vertical signal lines provided within the amplifying type solid-state imaging device are connected one end of first and second sample and hold circuits 6a (S/1H), 6b (S/2H) which sample and hold signals in response to sample control pulses $\phi$SH1, $\phi$SH2 supplied thereto. The other end of each of the sample and hold circuits 6a, 6b is connected to one end of the horizontal switching transistors Qh, Qh. An output signal from the first sample and hold circuit 6a is transmitted through one horizontal switching transistor Qh to a first output line as a first output signal Out1. An output signal from the second sample and hold circuit 6b is transmitted through the other horizontal switching transistor Qh to a second output line as a second output signal Out2.

Specifically, according to the solid-state imaging device of the present invention, there are provided two combinations of a sample and hold circuit 6 (sample and hold circuits 6a, 6b are collectively referred to hereinafter as a sample and hold circuit 6 when necessary) and the horizontal switching transistor Qh at every vertical signal line. Concurrently therewith, two output lines also are provided. Load transistors Q1, Q1, . . . , are connected between the respective vertical signal lines and the ground to thereby cause the MOS transistor Qe forming the pixel to operate in a source-follower circuit fashion.

Second, the solid-state imaging device according to the first embodiment of the present invention is different from the conventional amplifying type solid-state imaging devices shown in FIGS. 1, 2 in that the two output signals Out1, Out2 from the amplifying solid-state imaging device are amplified by AGC (automatic gain control) amplifiers 7a, 7b and input through a so-called swap switch 8 to a 1H delay line 9 and a subtracter 10. In this case, reference symbol 1H represents the one horizontal period.

More specifically, the swap switch 8 repeats a switching operation at every two horizontal periods in such a manner as to transmit the first output signal Out1 to the 1H delay line 9, to transmit the second output signal Out2 to the subtracter 10 during one horizontal period and to transmit the second output signal Out2 to the 1H delay line 9 and to transmit the first output signal Out1 to the subtracter 10 during the next horizontal period.

An output signal from the 1H delay line 9 is input to the plus-side input terminal of the subtracter 10, and the output signal that is directly transmitted from the swap switch 8 to the subtracter 10 is input to the minus-side input terminal of the subtracter 10.

Operation of the solid-state imaging device according to this embodiment will be described below with reference to FIG. 4. In this embodiment, it is assumed that a signal is read out at the field unit. Only one of the odd and even fields is illustrated in FIG. 4.

Let it now be assumed that nth and n+1th horizontal lines are selected. Specifically, as shown in FIG. 4, selection pulses $\phi V_n$, $\phi V_{n-1}$ are held at a middle level during the last one third period of the horizontal blanking period of the horizontal period, whereby a signal is read out from nth and n−1th rows of the pixel. The signal thus read out, of course, includes both a pixel signal and a noise signal. The signal thus read out is sampled and held by the first sample and hold circuit 6a (S/H1) at a timing of the sample control pulse $\phi$SH1 during the horizontal blanking period, and is then output from a first output line through the horizontal switching transistor Qh driven by the horizontal scanner 2 during the effective period of the horizontal scanning period. This output signal is expressed as S(n, n−1) in FIG. 4.

This signal is input to the 1H delay means 9 through the swap switch 8 from the amplifier 7a.

In the next horizontal period, the selection pulses $\phi V_n$, $\phi V_{n-1}$ are held at a high level and the pixel is reset. Then, the selection pulses $\phi V_n$, $\phi V_{n-1}$ are held at a middle level to read out a dark signal, i.e., a noise signal, after which the pulses $\phi V_n$, $\phi V_{n-1}$ are held at a low level.

The sample control pulse $\phi$SH1 is output during the time when the dark signal is read out, and allows the first sample and hold circuit 6a (S/1H) to sample the signal of the nth and n+1th rows of the pixel, i.e., noise signal N(n, n+1).

Since the noise signal N(n, n+1) is output from the amplifying type solid-state imaging device as the first output signal Out1 during the effective period, and the swap switch 8 is changed in position at every horizonal period through the AGC amplifier 7b, the noise signal N(n, n+1) is input to the minus-side input terminal of the subtracter 10.

Therefore, the subtracter 10 is supplied at its plus-side input terminal with the pixel signal (i.e., pixel signal containing a noise signal, strictly speaking) S(n, n−1) inputted to the 1H delay line 9 one horizontal period before, and is also supplied at its minus-side input terminal with a noise signal N(n, n−1), to thereby carry out a subtraction of S(n, n−1)−N(n, n−1). Thus, the subtracter 10 outputs a pixel signal from which a noise signal of nth and n−1th rows of the pixel, i.e., FPN is canceled.

During the two horizontal periods in which the first sample and hold circuit 6a samples and holds the pixel signal S(n, n−1) and the noise signal N(n, n−1), the second sample and hold circuit 6b operates as follows.

When the first sample and hold circuit 6a samples and holds the pixel signal S(n, n−1), the second sample and hold circuit 6b samples and holds a noise signal N(n−3, n−2) of the n−3th and n−2th rows of the pixel. Then, the noise signal N(n−3, n−2) is input through the AGC amplifier 7b and the swap switch 8 to the minus-side input terminal of the subtracter 10, in which it is subtracted from a pixel signal S(n−3, n−2) that has been input to the 1H delay line 9 at every horizontal period. As a consequence, the solid-state imaging device outputs a pixel signal from which a noise signal of the n−3 and n−2th rows of the pixel is canceled.

When the first sample and hold circuit 6a samples and holds the noise signal N(n, n−1), the second sample and hold circuits 6b sample and hold a pixel signal of S(n+1, n+2) of the n+1th and n+2th rows of the pixel.

As described above, when one sample and hold circuit 6 samples and holds the pixel signal S, the other sample and hold circuit 6 samples and holds the noise signal N of the pixel different from that of the pixel signal S. Then, when the sample and hold circuits 6a, 6b are assumed to be the same sample and hold circuit 6, the sample and hold circuit 6 samples and holds the pixel signal S of a pair of rows in one horizontal period and samples and holds the noise signal N of the same rows in the next horizontal period. The above operation is repeated by the sample and hold circuit 6.

Therefore, according to the solid-state imaging device of the present invention, the pixel signal from each pixel can be output under the condition that the noise signal of each pixel is canceled therefrom. Moreover, since the pixel signal and the noise signal of the same row are processed by the same sample and hold circuit 6, a characteristic difference between the first and second sample and hold circuits 6a, 6b can be prevented from being mixed into the pixel signal, i.e., the FPN of the sample and hold circuit 6 also can be canceled. Therefore, the FPN can be canceled perfectly.

Figure 5:
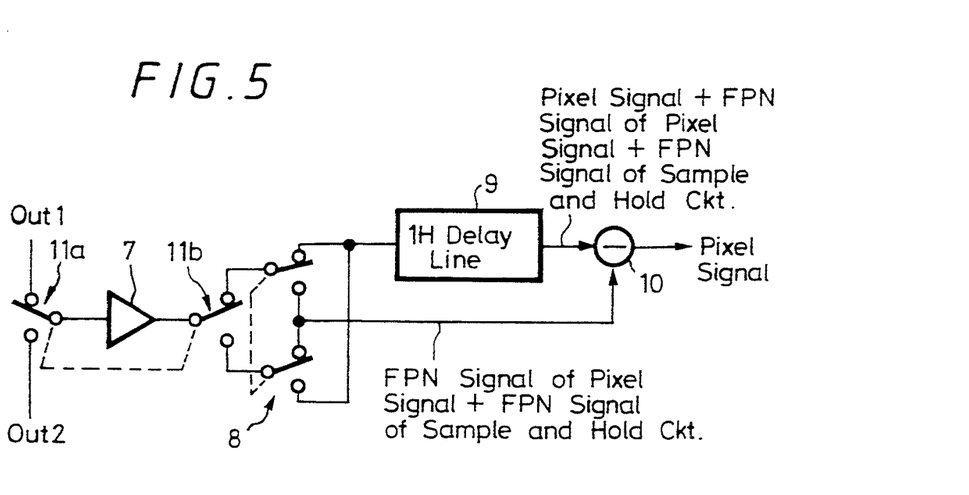
FIG. 5 is a circuit diagram showing a main portion of a modified example of the first embodiment according to the present invention.

FIG. 5 is a circuit diagram showing a main portion of a modified example of the solid state imaging device shown in FIG. 3. According to the modified example of the present invention, as shown in FIG. 5, the first and second output signals Out1 and Out2 are amplified by a single AGC amplifier 7 in a time-division manner. A contrast difference can be prevented from being produced between the scanning lines due to a gain difference between the AGC amplifiers 7a and 7b shown in FIG. 3.

Although the AGC amplifiers 7a, 7b are not indispensable for the present invention from a theory standpoint, the level of the signal should preferably be raised in order to increase an S/N (signal-to-noise ratio) so that a random noise that is increased by the subtraction processing may become negligibly small. The AGC amplifiers 7a, 7b are provided in order to raise the level of the signal as described above. It is, however, unavoidable that the two AGC amplifiers 7a, 7b have a gain difference therebetween even though they are manufactured similarly.

To solve the aforesaid problem, as shown in FIG. 5, the two signals Out1, Out2 from the amplifying type solid-state imaging device are amplified by the AGC amplifier 7. Switches (second switching means) 11a, 11b are connected to the front and rear stages of the AGC amplifier 7 so as to change in position to the first output Out1 side or the second output Out2 side so that the AGC amplifier 7 can be operated to amplify the signal in a time division manner.

Figure 6:
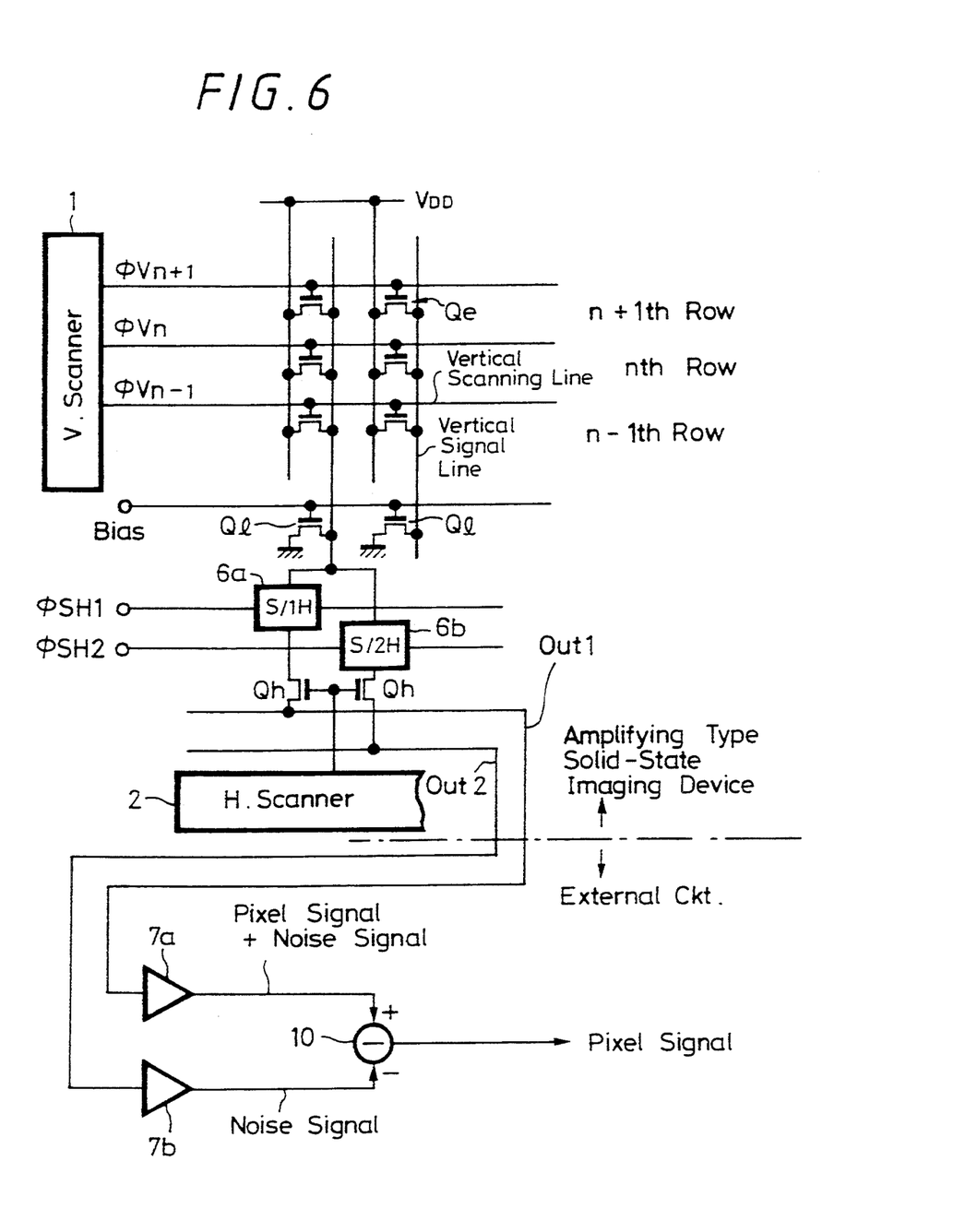
FIG. 6 is a diagram showing an arrangement of a solid-state imaging device according to a second embodiment of the present invention.
Figure 7:
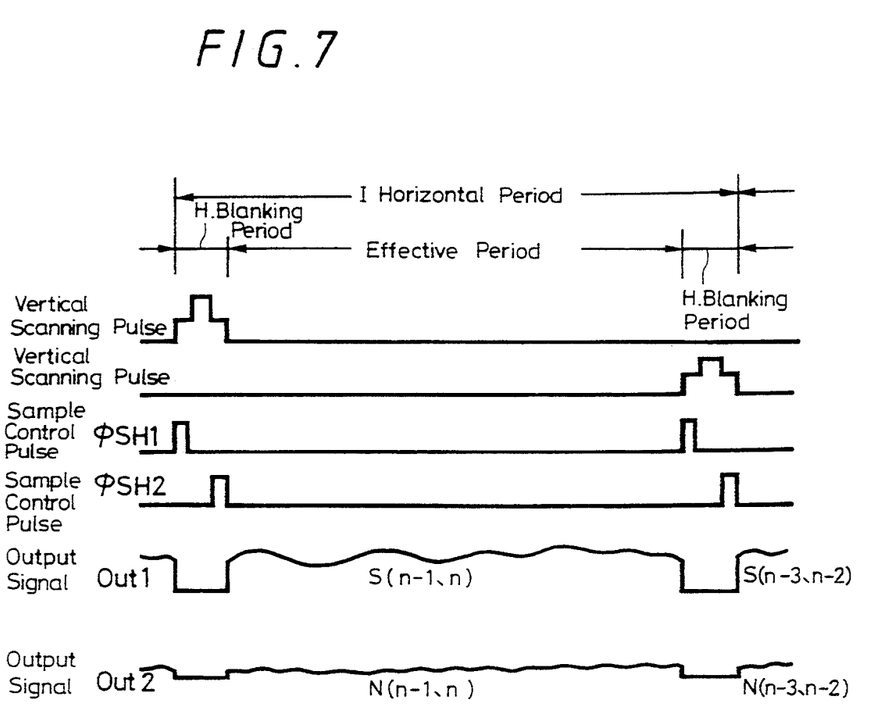
FIG. 7 is a timing chart used to explain operation of the second embodiment according to the present invention.

The solid-state imaging device according to a second embodiment of the present invention will be described below with reference to FIGS. 6 and 7. FIG. 6 is a diagram showing an arrangement of the solid-state imaging device according to the second embodiment of the present invention. FIG. 7 is a timing chart used to explain operation of the second embodiment of the present invention.

The second embodiment shown in FIG. 6 is exactly the same as the first embodiment shown in the FIG. 3 in circuit arrangement of the amplifying type solid-state imaging device. However, the second embodiment is different from the first embodiment in the circuit arrangement and operation of the external circuit of the amplifying type solid-state imaging device.

According to the second embodiment, as shown in FIG. 6, the first output signal Out1 from the first sample and hold circuit 6a is input through the AGC amplifier 7a to the plus-side input terminal of the subtracter 10. The second output signal Out2 from the second sample and hold circuit 6b is input through the AGC amplifier 7b to the minus-side input terminal of the subtracter 10.

The first and second sample and hold circuits 6a, 6b sample and hold the pixel signal and the noise signal of the same pixel at the same time.

More specifically, as shown in FIG. 7, immediately after the horizontal blanking period of one horizontal period begins, the pixel signal $S(n-1, n)$ of selected rows, e.g., the $n-1$th and nth rows is read out. Then, the first sample and hold circuit 6a samples and holds the pixel signal $S(n-1, n)$ in response to the sample control pulse $\phi SH1$ supplied thereto. Subsequently, the pixel of the $n-1$th and nth rows is reset and then the noise signal $N(n-1, n)$ is read out. The second sample and hold circuit 6b samples and holds the noise signal $N(n-1, n)$ in response to the sample control pulse $\phi SH2$ supplied thereto.

When the horizontal blanking period is ended and the effective period begins, the pixel signal $S(n-1, n)$ and the noise signal $N(n-1, n)$ are output simultaneously, i.e., the pixel signal and the noise signal of the same rows $(n-1, n)$ of the pixel are output and then input to the subtracter 10. Consequently, the signal of the pixel signal S—noise signal N is output from the subtracter 10 as the pixel signal, i.e., the pixel signal whose FPN is canceled is output from the subtracter 10.

Therefore, the solid-state imaging device of this embodiment does not need the 1H delay line 9 and the swap switch 8.

Figure 8:
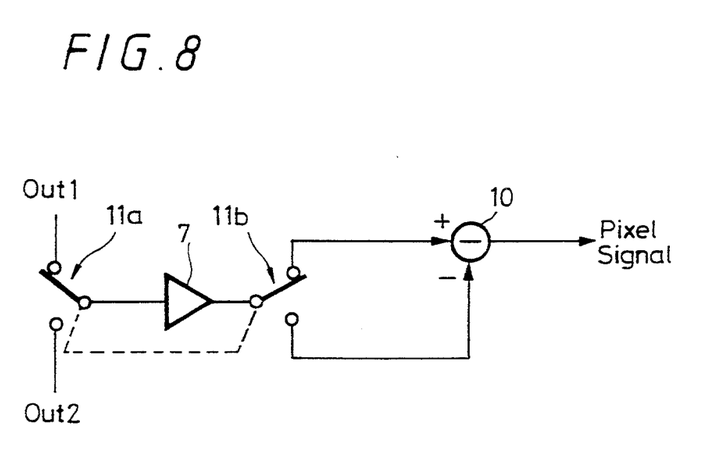
FIG. 8 is a circuit diagram showing a main portion of a modified example of the second embodiment according to the present invention.

FIG. 8 shows a main portion of a modified example of the second embodiment shown in FIG. 6. According to this modified example, as shown in FIG. 8, the first and second output signals Out1, Out2 are amplified by the single AGC amplifier 7 in a time division manner in exactly the same way as that of the modified example shown in FIG. 5. Also, the switches 11a, 11b are connected to the front and rear stages of the AGC amplifier 7 in order as to change position to the first output signal Out1 side or to the second output signal Out2 side, so that the AGC amplifier 7 may amplify the first and second output signals Out1, Out2 in a time division manner. Thus, it is possible to prevent a contrast difference from being produced between the scanning lines due to a gain difference of the AGC amplifier 7.

According to the solid-state imaging device of the present invention, one end of each of the first and second sample and hold circuits is connected to the vertical signal lines. The subtracter is connected to the rear stage of the sample and hold circuits through the switching means. The subtracter subtracts the noise signal output from one of the first and second sample and hold circuits from the pixel signal output from the other of the first and second sample and hold circuits.

Therefore, according to the solid-state imaging device of the present invention, since the pixel signal and the noise signal of the same pixel output from the first and second sample and hold circuits are simultaneously input to the subtracter which then subtracts the noise signal from the pixel signal, the FPN (fixed pattern noise) of each pixel can be canceled accurately and reliably. Thus, even when the FPN between the pixels is fluctuated, it is possible to obtain an accurate pixel signal, i.e., a pixel signal which precisely corresponds to the amount of light incident on the pixel.

According to the solid-state imaging device of the present invention, since the pixel signal and the noise signal are sampled and held by the same sample and hold circuit without fail, the FPN in the sample and hold circuit can be prevented from being mixed into the pixel signal and a more accurate noise signal can be obtained, According to the solid-state imaging device of the present invention, the first and second sample and hold circuits sample and hold the pixel signal and the noise signal at every horizontal scanning period alternately so that the pixel signal and the noise signal that were sampled and held during the same horizontal scanning period are generated from another pixel. Thus, even when the pixel signal and the noise signal that were sampled and held by the first and the second sample and hold circuits during the same horizontal scanning period are generated from another pixel, the pixel signal and the noise signal of the same pixel can be simultaneously input to the subtracter by alternately sampling and holding the pixel signal and the noise signal by the first and second sample and hold circuits and by delaying the pixel signal, and the FPN can be canceled.

According to the solid-state imaging device of the present invention, one end of each of the first and second sample and hold circuits is connected to the vertical signal lines. The output from the first sample and hold circuit is input to one input terminal of the subtracter and the output from the second sample and hold circuit is input to the other input terminal of the subtracter. The subtracter subtracts the noise signal from the pixel signal of the same pixel. Therefore, the first sample and hold circuit samples and holds the pixel signal and the second sample and hold circuit samples and holds the noise signal. The pixel signal and the noise signal are simultaneously input to the subtracter through the first and second output lines. Consequently, it is possible to remove the switching means that is used to input the pixel signal and the noise signal of the same pixel to the subtracter at the same time.

According to the solid-state imaging device of the present invention, the first and second sample and hold circuits and the subtracter have the amplifying means and the second switching means provided at the front and rear stage of the amplifier connected therebetween. Therefore, since the two signals from the first and second sample and hold circuits are switched by the second switching means and amplified by one amplifying means, the S/N ratio can be improved and the subtracter can subtract the noise signal from the pixel signal. Moreover, because the subtracted pixel signal and the subtracted noise signal are amplified by the same amplifying means, the FPN in the amplifying means can be prevented from being mixed into the pixel signal.

According to the solid-state imaging device of the present invention, since the vertical signal lines are grounded through the load means, the MOS transistor which forms the pixel and the load means constitute the source-follower circuit, so that the output impedance is lowered.

Further, according to the solid-state imaging device of the present invention, since each pixel includes the MOS transistor having a gate connected to the vertical scanning lines, a source connected to the vertical signal lines and a drain connected to the power supply, the solid-state imaging device of the present invention can be applied to a solid-state imaging device of the type such that the pixel is formed of the MOS transistor.

Furthermore, according to the solid-state imaging device of the present invention, since the MOS transistor of each pixel is arranged such that a channel current is modulated on the basis of an amount of electric charges which are accumulated under the gate thereof by a photoelectric conversion, the solid-state imaging device of the present invention can be applied to the amplifying type solid-state imaging device.

Having described preferred embodiments of the invention with reference to the accompanying drawings, it is to be understood that the invention is not limited to those precise embodiments, and that various changes and modifications could be effected therein by one skilled in the art without departing from the spirit or scope of the invention as defined in the appended claims.

What is claimed is:

1. A solid-state imaging device, comprising:
   a plurality of pixel devices each representing a pixel of an image for converting incident light into a pixel signal containing noise, said pixel devices basing arranged in a matrix of rows and columns;
   pixel devices in each row being connected to a corresponding vertical scanning line, and a vertical scanner connecting to each of the vertical scanning lines;
   pixel devices in each column connecting to a corresponding vertical signal line for outputting the pixel signals generated by the pixel devices;
   each vertical signal line connecting to an input of first and second sample-and-hold circuits, said first and second sample-and-hold circuits each respectively sampling and holding alternately a pixel signal containing noise and a noise signal;
   a subtracter having first and second inputs and outputting a pixel output signal having said noise signal subtracted therefrom;
   switching means connected between outputs of said first and second sample-and-hold circuits and said first and second inputs of said subtracter such that in a first position of the switching means the output of the first sample-and-hold circuit is connected to the first input of the subtracter and the output of the second sample-and-hold circuit is connected to the second input of the subtracter, and wherein in a second position of the switching means, the output of the first sample-and-hold circuit is connected to the second input of the subtracter and the output of the second sample-and-hold circuit is connected to the first input of the subtracter; and
   horizontal switching devices respectively connecting the outputs of the first and second sample-and-hold circuits to said switching means, and a horizontal scanner connected to the horizontal switching devices for controlling the horizontal switching devices for read-out of pixel signals and noise signals from the sample-and-hold circuits for pixel devices along a row.

2. A solid-state imaging device according to claim 1 wherein:
   a noise signal sampled and held by the second sample-and-hold circuit is from a pixel device which is different than a pixel device from which a pixel signal comes and which is sampled and held by the first sample-and-hold circuit; and
   a pixel signal sampled and held by the second sample-and-hold circuit is from a pixel device which is different than a pixel device from which a noise signal comes and which is sampled and held by the first sample-and-hold circuit.

3. A solid-state imaging device according to claim 1 wherein said first and second sample-and-hold circuits sample and hold said pixel signal and said noise signal alternately at every horizontal scanning period so that a pixel signal and a noise signal to be sampled and held during a same horizontal scanning period are generated from different pixel devices.

4. A solid-state imaging device according to claim 1 wherein said switching means comprises a first amplifier connecting between said first sample-and-hold circuit and a first switch section, a second amplifier connected between the output of the second sample-and-hold circuit and a second switch section, the first and second switch sections having outputs connecting through a one horizontal line delay line to the first input of the subtracter and also having outputs connecting to the second input of the subtracter.

5. A solid-state imaging device according to claim 1 wherein said switching means comprises a first switch connecting to outputs of said sample-and-hold circuits, an output of said first switch connecting through an amplifier to a second switch, outputs of the second switch connecting to third and fourth switches, and a first set of outputs of the third and fourth switches connecting through a one horizontal line delay line to the first input of the subtracter and a second set of outputs of the third and fourth switches connecting to the second input of the subtracter.

6. A solid-state imaging device according to claim 1 wherein said vertical signal lines are grounded through respective switchable load devices.

7. A solid-state imaging device according to claim 1 wherein said pixel devices each comprise a MOS transistor having a gate connected to a respective vertical scanning line, a source connected to a respective vertical signal line, and a drain connected to a power source.

8. A solid-state imaging device according to claim 1 wherein said MOS transistor has a channel current modulated based on a quantity of electric charges accumulated under the gate thereof by photoelectric conversion.

9. A solid-state imaging device according to claim 1 wherein said switching means includes a one horizontal line delay line having its output connected to said first input of said subtracter and its input connected to at least two switch sections.

10. A solid-state imaging device, comprising:
    a plurality of pixel devices each representing a pixel of an image for converting incident light into a pixel signal containing noise, said pixel devices being arranged in a matrix of rows and columns;
    pixel devices in each row being connected to a corresponding vertical scanning line, and a vertical scanner connecting to each of the vertical scanning lines;
    pixel devices in each column connecting to a corresponding vertical signal line for outputting the pixel signals generated by the pixel devices;

each vertical signal line connecting to an input of first and second sample-and-hold circuits, said first sample-and-hold circuit sampling and holding a pixel signal containing noise and said second sample-and-hold circuit sampling and holding a noise signal after resetting the pixel device generating said pixel signal sampled and held by the first sample-and-hold circuit, so that the pixel signal and noise signal being sampled and held by the first and second sample-and-hold circuits at the same time are generated from the same pixel element;

a subtracter having first and second inputs outputting a pixel output signal having said noise signal subtracted therefrom, said first input of the subtracter connecting to an output of said first sample-and-hold circuit and said second input of said subtracter connecting to an output of said second sample-and-hold circuit; and horizontal switching devices respectively connecting the outputs of the first and second sample-and-hold circuits to said first and second inputs of said subtracter, and a horizontal scanner connected to the horizontal switching devices for controlling the horizontal switching devices for read-out of pixel and noise signals from the first and second sample-and-hold circuits for respective pixel devices along a row.

11. A solid-state imaging device according to claim 10 wherein load devices are connected to vertical signal lines for selectively grounding the vertical signal lines.

12. A solid-state imaging device according to claim 10 wherein said pixel devices each comprise a MOS transistor having a gate connected to a respective vertical scanning line, a source connected to a respective vertical signal line, and a drain connected to a power source.

13. A solid-state imaging device according to claim 12 wherein load devices are connected to vertical signal lines for selectively grounding the vertical signal lines.

14. A solid-state imaging device according to claim 10 wherein an amplifier is provided between the fourth subtracter input and the respective horizontal switching device and a second amplifier is provided between the subtracter second input and respective horizontal switching device.

15. A solid-state imaging device according to claim 10 wherein the first sample-and-hold circuit output is connected to the first input of the subtracter via a first switch section, an amplifier, and a second switch section, and wherein the output of the second sample-and-hold circuit is connected to the second input of the subtracter by said first switch section, said amplifier, and said second switch section.

16. A solid-state imaging device, comprising;
a plurality of pixel devices each representing a pixel of an image for converting incident light into a pixel signal containing noise, said pixel devices being arranged in a matrix of rows and columns;

pixel devices in each row being connected to a corresponding vertical scanning line, and a vertical scanner connecting to each of the vertical scanning lines;

pixel devices in each column connecting to a corresponding vertical signal line for outputting the pixel signals generated by the pixel devices;

each vertical signal line connecting to an input of first and second sample-and-hold circuits, said first and second sample-and-hold circuits each respectively sampling and holding alternately a pixel signal containing noise and a noise signal, the noise signal being generated by a pixel element which is different than a pixel element which generated said pixel signal;

a subtracter having first and second inputs and outputting a pixel output signal having said noise signal subtracted therefrom;

means for delaying an output of the pixel signals from said first and second sample-and-hold circuits by one horizontal scanning period and for outputting the delayed pixel signal to said first input of said subtracter;

switching means for connecting outputs of the first and second sample-and-hold circuits in alternate fashion to the means for delaying and to the second input of the subtracter; and horizontal switching devices respectively connected between the outputs of the first and second sample-and-hold circuits and said switching means, and a horizontal scanner connected to the horizontal switching devices for controlling the horizontal switching devices for read-out of pixel signals and noise signals from the sample-and-hold circuits for pixel devices along a row.

* * * * *